(12) United States Patent
Ziaylek et al.

(10) Patent No.: US 6,827,541 B1
(45) Date of Patent: Dec. 7, 2004

(54) APPARATUS FOR HOLDING ELONGATED OBJECTS HORIZONTALLY ADJACENT TO A VEHICULAR BODY WHICH IS MOVABLE BETWEEN AN UPPER STORAGE POSITION AND A LOWER ACCESS POSITION

(76) Inventors: Michael Paul Ziaylek, 15 Cold Spring Ave., Yardley, PA (US) 19067; Theodore Ziaylek, Jr., 140 Riverview Dr., Yardley, PA (US) 19067; Theodore P. Ziaylek, 152 Riverview Ave., Yardley, PA (US) 19067

(*) Notice: Subject to any disclaimer, the term of this patent is extended or adjusted under 35 U.S.C. 154(b) by 34 days.

(21) Appl. No.: 10/413,654

(22) Filed: Apr. 15, 2003

(51) Int. Cl.[7] ............................................... E06C 5/00
(52) U.S. Cl. ...................................... 414/462; 182/127
(58) Field of Search .................... 182/127; 224/548, 224/553; 414/462, 546, 680

(56) References Cited

U.S. PATENT DOCUMENTS

| | | |
|---|---|---|
| 1,890,940 A | 12/1932 | Fox |
| 1,898,826 A | 2/1933 | Fox |
| 2,080,527 A | 5/1937 | Bixel |
| 2,586,531 A | 2/1952 | Gordon |
| 2,946,397 A | 7/1960 | Berbevich |
| 3,013,681 A | 12/1961 | Gavnett |
| 3,058,607 A | 10/1962 | Kiley |
| 3,480,107 A | 11/1969 | Goodhue |
| 3,720,334 A | 3/1973 | Permat et al. |
| 3,963,136 A | 6/1976 | Spanke |
| 4,008,838 A | 2/1977 | Correll |
| 4,170,331 A | 10/1979 | Faulstich |
| 4,243,120 A | 1/1981 | Pratt, Jr. et al. ............... 182/98 |
| 4,262,834 A | 4/1981 | Nutt ............................. 224/324 |
| 4,339,064 A | 7/1982 | Ziaylek, Jr. .................. 224/324 |
| 4,390,117 A | 6/1983 | Fagan .......................... 224/310 |
| 4,408,680 A | 10/1983 | Ross ............................ 182/68 |
| 4,618,083 A | 10/1986 | Weger, Jr. ................... 224/324 |
| 4,751,981 A | 6/1988 | Mitchell et al. ............. 182/127 |
| 4,826,387 A | 5/1989 | Audet .......................... 414/462 |
| 4,827,742 A | 5/1989 | McDonald ..................... 70/19 |
| 4,844,490 A | 7/1989 | Kohler ........................... 280/4 |
| 4,877,108 A | 10/1989 | Griffin et al. ................. 182/68 |
| 4,887,750 A | 12/1989 | Dainty ....................... 224/42.11 |
| 5,009,350 A | 4/1991 | Schill et al. ................. 224/324 |
| 5,048,641 A | 9/1991 | Holcomb et al. ............ 182/127 |
| 5,058,791 A | 10/1991 | Henriquez et al. .......... 224/310 |
| 5,104,280 A | 4/1992 | Ziaylek et al. .............. 414/462 |
| D331,030 S | 11/1992 | Ziaylek et al. ................. D12/1 |
| 5,172,952 A | 12/1992 | Lasnetski .................... 296/37.8 |
| 5,297,912 A | 3/1994 | Levi ............................. 414/462 |
| 5,398,778 A | 3/1995 | Sexton ........................ 182/127 |
| 5,469,933 A | 11/1995 | Thomason ................... 182/127 |
| 5,518,357 A | 5/1996 | Ziaylek, Jr. ................. 414/462 |
| 5,791,857 A | 8/1998 | Ziaylek, Jr. et al. ........ 414/462 |
| 5,850,891 A | 12/1998 | Olms et al. .................. 182/127 |
| 6,092,972 A | 7/2000 | Levi ............................. 414/462 |
| 6,105,720 A | 8/2000 | Kumher et al. ............. 182/127 |
| 6,179,543 B1 | 1/2001 | Adame et al. ............... 414/462 |
| 6,257,534 B1 | 7/2001 | Finley ......................... 248/201 |
| 6,315,181 B1 | 11/2001 | Bradley et al. ............. 224/310 |
| 6,321,873 B1 | 11/2001 | LaBrash ..................... 182/187 |
| 6,360,930 B1 | 3/2002 | Flickenger ................. 224/310 |

*Primary Examiner*—Janice L. Krizek
(74) *Attorney, Agent, or Firm*—Sperry, Zoda & Kane (57) ABSTRACT

An apparatus usable primarily with emergency vehicles wherein a ladder or other large piece of emergency equipment can be maintained in a horizontal orientation stored above the vehicle body and is movable to a lower access position to facilitate removal and replacement thereof. Power is provided by two hydraulic cylinders connected to an arm which drives a driveshaft connected to a lift arm. Once such support assembly is located in the forward portion of the vehicle body and another similar support assembly is located in the rear portion thereof. A longitudinal support extends between the lifting arms and includes a locking device thereon to facilitate securement of ladders or other longitudinal objects thereto. Positioning of the support assemblies at opposite ends of the vehicle body enhances access to the storage compartments located on the lateral sides of the vehicular body such as for fire trucks and the like.

20 Claims, 6 Drawing Sheets

APPARATUS FOR HOLDING ELONGATED OBJECTS HORIZONTALLY ADJACENT TO A VEHICULAR BODY WHICH IS MOVABLE BETWEEN AN UPPER STORAGE POSITION AND A LOWER ACCESS POSITION

BACKGROUND OF THE INVENTION

1. Field of the Invention

The present invention deals with the field of devices for facilitating the storage of ladders and other elongated objects in a horizontal orientation with respect to vehicles and, in particular, emergency vehicles such as fire trucks, ambulances or other utility vehicles. Such vehicles often utilize a single piston and lifting arm for urging movement of a support bracket between an upper storage position above the vehicle and a lower access position adjacent the vehicle. The present invention provides a unique configuration where two separate support assemblies are included, one at the front-most portion of the vehicle body and the other at the rearmost portion of the vehicle body which allows full use of compartments laterally along each side of such emergency vehicles. With emergency vehicles today storage of the many different types of equipment is an important aspect of vehicle design and utility and for this reason the present invention provides a means for maximizing use of such laterally located compartments.

2. Description of the Prior Art

There have been numerous prior art designs to facilitate storage of ladders and other rather large equipment with respect to utility and emergency vehicles such as shown in U.S. Pat. No. 5,009,350 patented Apr. 23, 1991 to J. M. Schill et al on "Retainer Assemblies For Elongated Objects"; and U.S. Pat. No. 5,048,641 patented Sep. 17, 1991 to J. N. Holcomb et al and assigned to Jack N. Holcomb on a "Van-Mounted Ladder Assembly With Concealed Radio Antennas"; and U.S. Pat. No. 5,058,791 patented Oct. 22, 1991 to K. R. Henriques et al and assigned to Slide-Out, Inc. on a "Vehicular Ladder Rack"; and U.S. Pat. No. 5,104,280 patented Apr. 14, 1992 to M. P. Ziaylek et al and assigned to Michael P. Ziaylek on "Apparatus For Use With An Emergency Vehicle For Storage And Retrieval Of Remotely Located Emergency Devices"; and U.S. Design Pat. No. D331,030 patented Nov. 17, 1992 to M. P. Ziaylek et al and assigned to Michael P. Ziaylek on a "Unit For Use With An Emergency Vehicle For Storage And Retrieval Of Remotely Located Emergency Devices"; and U.S. Pat. No. 5,172,952 patented Dec. 22, 1992 to R. Lasnetski on an "Overhead Storage Rack For Storing Ladders Or The Like"; and U.S. Pat. No. 5,297,912 patented Mar. 29, 1994 to A. Y. Levit and assigned to JAJ Products, Inc. on a "Ladder Rack For Motor Vehicles"; and U.S. Pat. No. 5,398,778 patented Mar. 21, 1995 to R. Sexton on a "Ladder Rack Securing And Release System"; and U.S. Pat. No. 5,469,933 patented Nov. 28, 1995 to J. Thomason on a "Vehicle Mounted Ladder"; and U.S. Pat. No. 5,518,357 patented May 21, 1996 to T. Ziaylek, Jr. et al and assigned to Theodore Ziaylek, Jr. and Michael P. Ziaylek on a "Retaining And Retrieval Apparatus For Storage Of A Ladder Upon A Vehicle Shelf Area"; and U.S. Pat. No. 5,791,857 patented Aug. 11, 1998 to Theodore Ziaylek, Jr. et al and assigned to Theodore Ziaylek, Jr. and Michael Paul Ziaylek on an "Automatic Ladder Lowering And Storage Device For Use With An Emergency Vehicle"; and U.S. Pat. No. 5,850,891 patented Dec. 22, 1998 to J. J. Olms et al and assigned to Trimble Navigation Limited on a "Motorized Rack System"; and U.S. Pat. No. 6,092,972 patented Jul. 25, 2000 to A. Y. Levi on a "Truck Mounted Ladder Rack"; and U.S. Pat. No. 6,105,720 patented Aug. 22, 2000 to D. A. Kumber et al on a "Multi-Position Ladder And Support Therefor"; and U.S. Pat. No. 6,179,543 patented Jan. 30, 2001 to D. Adame et al on a "Rack For Motor Vehicles"; and U.S. Pat. No. 6,257,534 patented Jul. 10, 2001 to A. L. Finley and assigned to Fibre Body Industries INC on a "Ladder Rack Assembly"; and U.S. Pat. No. 6,315,181 patented Nov. 13, 2001 to J. A. Bradley et al and assigned to Adrian Steel Company on a "Ladder Rack Apparatus And Method"; and U.S. Pat. No. 6,321,873 patented Nov. 27, 2001 to R. LaBrash and assigned to Tra-Lor-Mate, Inc. on a "Ladder Mounting System"; and U.S. Pat. No. 6,360,930 patented Mar. 26, 2002 to M. Flickenger and assigned to L & P Property Management Company on a "Vehicle Rack Assembly With Hydraulic Assist".

SUMMARY OF THE INVENTION

The present invention provides an apparatus for holding elongated objects in a horizontal orientation adjacent to a vehicular body. The apparatus is designed to move the horizontally oriented elongated object such as a ladder or the like between an upper storage position and a lower access position. At the upper storage position the object is stored and provides full access to all compartments on both sides of the vehicle body whereas at the lower access position the object can be removed therefrom for usage or secured thereto for movement to the storage position.

The apparatus preferably includes a forward support assembly which can be secured with respect to the vehicle body such as a truck body or the like. This support assembly preferably includes a forward driveshaft extending through the truck body such as to be rotatably movable. The forward driveshaft preferably includes an inner forward driveshaft section positioned within the vehicle body and an outer forward driveshaft section positioned outside of the vehicle body. Each section of the forward driveshaft is movable simultaneously.

The forward support assembly includes a forward drive arm pivotally mounted to the inner forward driveshaft section which extends outwardly therefrom for facilitating the powering of pivotal movement thereof. A forward longitudinally extendable device such as a forward hydraulic cylinder and piston respectively pivotally mounted with respect to the truck body and is pivotally secured with respect to the forward drive arm for the purpose of causing driving movement thereof between the storage and access positions responsive to longitudinal movement of the piston within the cylinder.

A forward lifting arm is also included fixedly secured to the outer forward driveshaft section and being rotatably movable therewith. This forward drive arm and the forward longitudinally extendable hydraulic cylinder and piston device are oriented at a position approximately perpendicularly or in any case between 60 and 90 degrees with respect to one another. In this manner whenever the forward lifting arm is adjacent the access position maximum power will be applied through the moment arm of force directed on the forward drive arm thereby. In this manner power will be enhanced for the rotational movement of the forward driveshaft responsive to the forward lifting arm being positioned at a location adjacent the lower access position thereof.

A forward support device is also fixedly securable to the forward lifting arm and is adapted to receive an object detachably secured thereto. The forward support arm is preferably movable between an upper storage position and a lower access position. A forward securement device is also included which is capable of securing an object detachably with respect to the forward support device to facilitate movement of the secured object between the upper storage position for storage thereof and the lower access position for providing access thereto.

A forward mounting bracket is also included fixedly secured to the vehicular body at a position within the body itself. The inner forward driveshaft section of the forward driveshaft is preferably rotatably mounted within the forward mounting bracket for the purpose of facilitating urging of selective movement of the forward lifting arm between the upper storage position and lower access position. A forward bearing is also included with the forward driveshaft extending therethrough to facilitate rotational movement thereof.

A rear support assembly is also included secured with respect to the vehicular body at a position spatially distant from the location of the forward support assembly. This spacing provides additional support for the mounting of elongated objects thereto and secure movement thereof between the upper storage position and the lower access position. The rear support assembly and the forward support assembly both are operative preferably to be connected to opposite ends of elongated objects such as a ladder.

The rear support assembly preferably includes a rear driveshaft extending through the truck body such as to be rotatably movable with respect to the body itself. This rear driveshaft preferably includes an inner rear driveshaft section positioned within the vehicular body and an outer rear driveshaft section positioned extending outside of the vehicular body and being simultaneously movable along with the inner rear driveshaft section. A rear drive arm is preferably pivotally mounted with respect to the inner rear driveshaft section such as to extend outwardly therefrom for urging pivotal movement. A rear longitudinally extendable means is pivotally mounted with respect to the vehicular body and pivotally secured with respect to the rear drive arm for the purpose of urging driving movement thereof between the storage position and the access position responsive to longitudinal movement thereof. The rear longitudinal extendable means preferably comprises a rear hydraulic cylinder and piston means.

A rear lifting arm is preferably included which is fixedly secured to the outer rear driveshaft section and is rotatable therewith. A rear support device is also preferably included in the rear support assembly and is fixedly secured to the rear lifting arm and adapted to receive an object detachably secured with respect thereto such as a ladder or the like. The rear support mechanism is preferably movable between an upper storage position and a lower access position. Also the rear drive arm and the rear longitudinally extendable hydraulic cylinder and piston device is preferably oriented approximately perpendicularly with respect to one another whenever the rear lifting arm is positioned adjacent the access position for the purpose of maximizing the moment arm of force directed on the rear drive arm for enhancing powering of rotating movement of the rear driveshaft responsive to the rear lifting arm being positioned adjacent the lower access position thereof.

The rear support assembly further includes a rear securement device for securing of an object detachably with respect to the rear support mechanism in order to facilitate movement of the secured object between the upper storage position for storage thereof and a lower access position for providing access thereto. Also included is a rear mounting bracket fixedly secured to the vehicular body at a position within the body. In this position the inner rear driveshaft section of the rear driveshaft will be rotatably mounted within the rear mounting bracket to facilitate urging movement of the rear lifting arm between the upper storage position and the lower access position as needed. A rear bearing may be included positioned within the rear mounting bracket with said rear driveshaft means extending therethrough to facilitate rotational movement thereof.

The present invention further includes a longitudinal support which can be fixedly secured to the forward support mechanism and the rear support mechanism simultaneously to facilitate securement of an object with respect thereto and to facilitate coordinated movement of the first support assembly and the rear support assembly between the upper storage position and the lower access position. A locking device may also be securable with respect to the longitudinal support means and adapted to detachably secure an elongated object such as a ladder with respect thereto as desired.

A forward safety clamping mechanism may be mounted on the vehicular body at a position adjacent the location of the forward lifting arm when in the upper storage position. This forward clamping mechanism will be operative to detachably clamp the forward lifting arm to prevent movement thereof when moved into the upper storage position. Furthermore, the forward safety clamping device will be operative to release the forward lifting arm prior to movement thereof away from the upper storage position.

A similarly configured rear safety clamping device will be mounted on the vehicular body at a position adjacent the location of the rear lifting arm when in the upper storage position. This rear clamping device will be operative to detachably clamp the rear lifting arm to prevent movement thereof when moved into the upper storage position for storage. The rear safety clamp is operative to release the rear lifting arm prior to movement thereof away from the upper storage position for facilitating safety of storage.

It is an object to provide an apparatus for holding elongated objects horizontally adjacent to a vehicular body movable between an upper storage position and a lower access position wherein elongated safety objects such as ladders and the like can be maintained horizontally at all points during movement between the storage position and the access position.

It is an object to provide an apparatus for holding elongated objects horizontally adjacent to a vehicular body movable between an upper storage position and a lower access position wherein the number of article containment compartments in the lateral areas of the truck body can be maximized when used with an emergency or other similar vehicle body configuration.

It is an object to provide an apparatus for holding elongated objects horizontally adjacent to a vehicular body movable between an upper storage position and a lower access position wherein power is applied more greatly for movement between the upper storage position and the lower access position responsive to the apparatus being positioned closer to the lower access position to overcome the additional forces needed because of the greater moment arm when positioned in this orientation.

It is an object to provide an apparatus for holding elongated objects horizontally adjacent to a vehicular body movable between an upper storage position and a lower access position wherein a number of moving parts is minimized.

It is an object to provide an apparatus for holding elongated objects horizontally adjacent to a vehicular body movable between an upper storage position and a lower access position wherein conventional hydraulic power can be utilized.

It is an object to provide an apparatus for holding elongated objects horizontally adjacent to a vehicular body movable between an upper storage position and a lower access position wherein manual movement of elongated objects such as ladders from high storage positions is made no longer necessary.

It is an object to provide an apparatus for holding elongated objects horizontally adjacent to a vehicular body movable between an upper storage position and a lower access position wherein the amount of internal compartment area within the truck body which is made unavailable due to the apparatus for storing a ladder above a truck body is significantly minimized.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a unique design for a system for automatically storing an elongated object such as a ladder 10 upon an emergency vehicle 12. It is important that such elongated objects or otherwise large objects such as ladder 10 be stored at an upper location with respect to a vehicle body 14 in a remote location to minimize any obstruction which might be caused by positioning it at a lower location. Normally such a vehicle body includes multiple compartments on the sides and access to these compartments is an important consideration. Access certainly is limited to these compartments when the elongated object 10 is moved to the lower access position 20. However, once the automated mechanism is returned to the upper storage position 18, full access to the side compartments 16 is provided.

The present invention provides a unique configuration for the positioning of the forward support assembly 22. With this positioning of the forward support assembly 22 adjacent the front vehicle body wall 58 and within the vehicle body and the positioning of the rear support assembly 62 adjacent the rear vehicle body wall 60 and within the vehicle body 14 itself a wide expanse will be available on both lateral sides of the vehicle body 14 for the positioning of the compartment 16 therein. In prior art designs the size of such compartments 16 and the access thereto has been limited by ladder storage systems. The present invention provides a ladder storage system which eliminates these difficulties.

It is important that coordinated movement between the forward support assembly 22 and the rear support assembly 62 is achieved. This is made possible by a longitudinal support means 96 which extends therebetween and coordinates the movement caused by powering thereof. Also a locking means 98 is included which is secured to the longitudinal support means 96 and is used for detachably securing of a ladder 10 with respect to the longitudinal support system 96 to facilitate movement of the ladder with support 96 as it moves between the upper storage position and the lower storage position.

Figure 1:
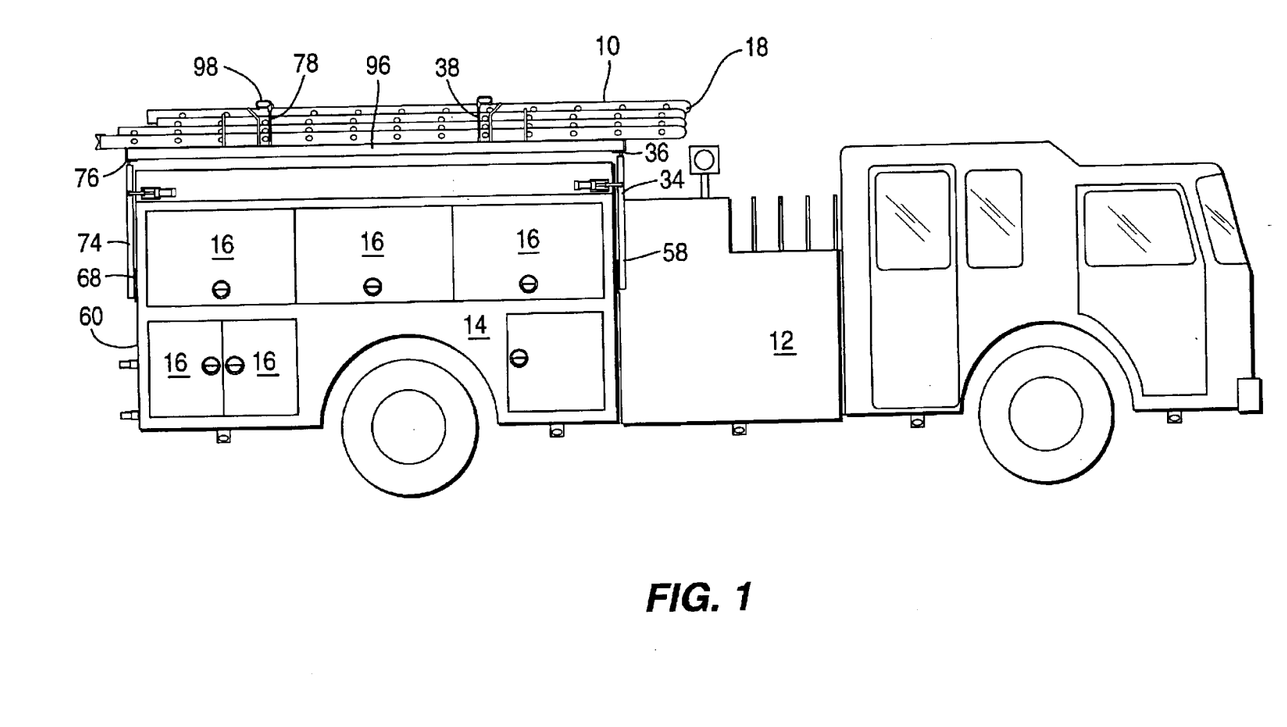
FIG. 1 is a side plan view of an embodiment of the apparatus of the present invention shown in the upper storage position in relation to a vehicular body.
Figure 2:
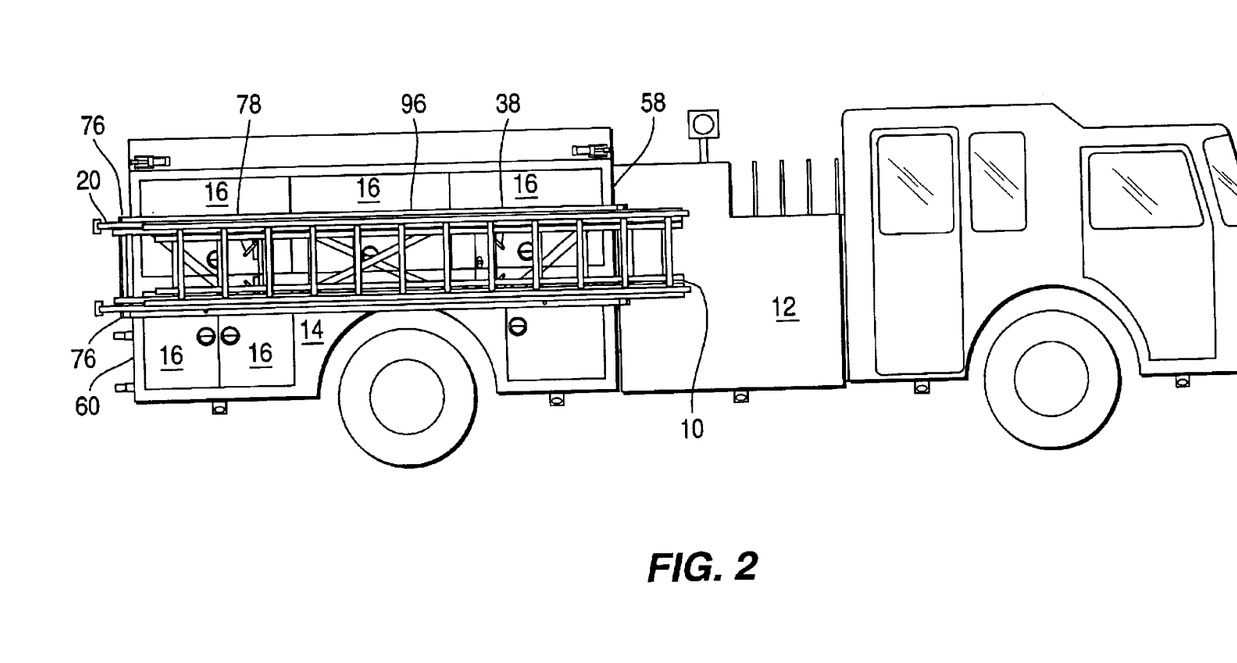
FIG. 2 is an illustration of the embodiment shown in FIG. 1 however with the apparatus located in the lower access position.
Figure 3:
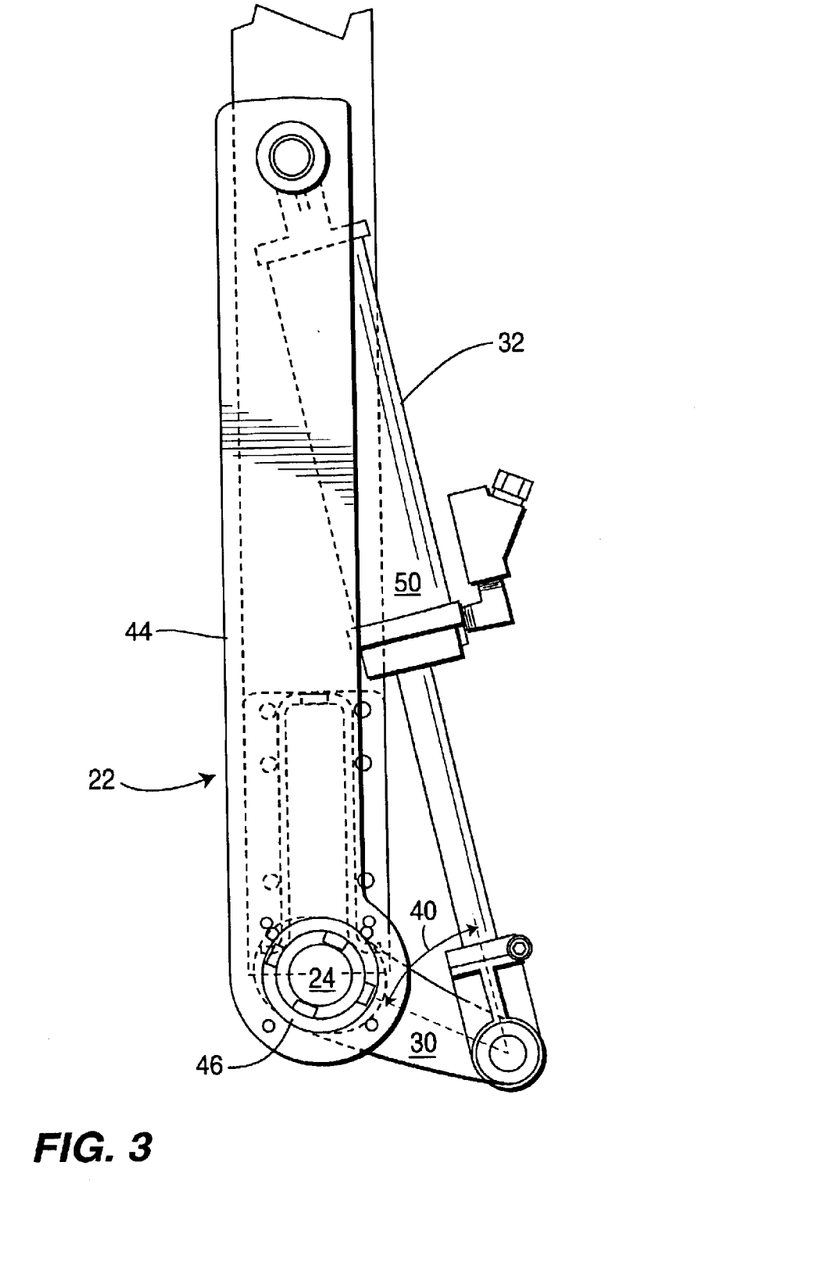
FIG. 3 is an end plan illustration of an embodiment of the forward support assembly of the present invention.
Figure 7:
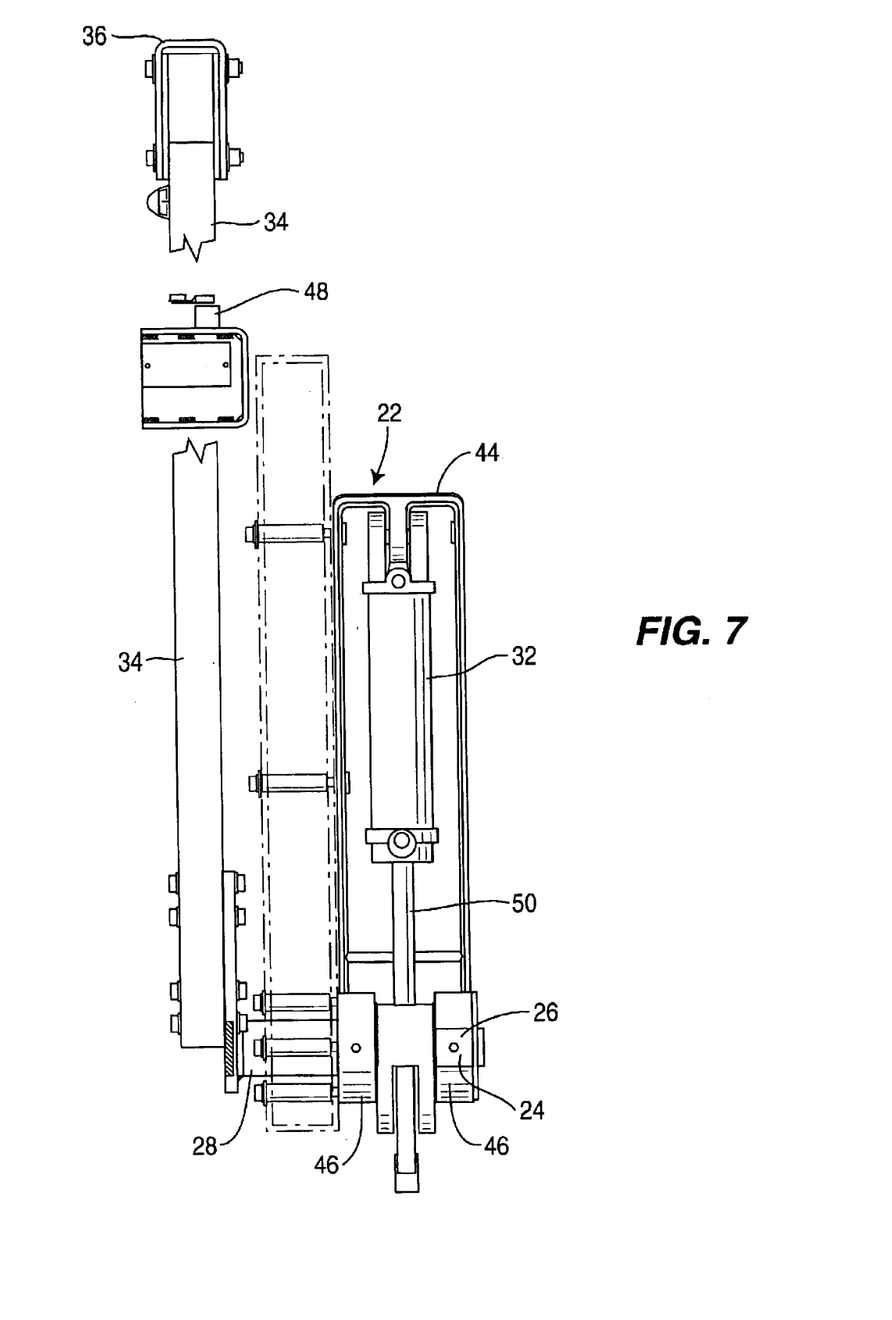
FIG. 7 is a side plan view of an embodiment of the forward support assembly of the present invention.

The forward support assembly 22 comprises a forward driveshaft means 24 which extends through the forward vehicle body wall 58. The forward driveshaft 24 will preferably include an inner forward driveshaft section 26 positioned within the vehicle body 14 and an outer forward driveshaft section 28 located outside or to the rear outside of the vehicle body 14 behind the front vehicle body wall 58. A forward drive arm 30 is preferably secured to the forward driveshaft 24 and extends outwardly thereof to provide a moment arm for facilitating power driving thereof. A forward longitudinally extendable means 32 which preferably comprises a forward hydraulic cylinder and piston means 50 is pivotally secured with respect to the vehicle body 14. It is also pivotally secured with respect to the forward drive arm 30. In this manner extending and retracting of the forward longitudinal extendable means 32 will urge movement of the forward drive arm 30 and result in rotational movement of the forward driveshaft means 24. A forward lifting arm means 34 is secured to the outer forward driveshaft section 28 to be movable therewith. This forward lifting arm 34 is movable between the upper storage position 18 and the lower access position 20. A forward support means 36 is secured to the forward lifting arm 34 which can have attached thereto a ladder 10 or other elongated object 10. A forward securement means 38 provides this means of attachment for the elongated object or ladder 10 with respect to the forward support 36. Powering of movement of the forward driveshaft 24 can be better achieved by the defining of a forward angle 40 between the forward drive arm and the forward longitudinally extendable means to be approximately 90 degrees or at least between 60 and 120 degrees as the forward lifting arm 34 is in or close to the lower access position 20. While in the lower access position 20 the force required for moving of the ladder 10 and the forward support 36 to which it is attached is greater than at other times during movement and the larger moment arm provided by this particular angular relationship between the forward drive arm and the forward longitudinally extendable member or hydraulic piston provides the additional power needed.

The configuration of the forward support assembly 22 is enhanced by the inclusion of a forward mounting bracket 44. This bracket is preferably fixedly secured within the vehicle body 14 on the inner surface of the forward vehicle body wall 58. The forward hydraulic cylinder and piston 50 are preferably pivotally secured with respect to the forward mounting bracket 44. Also a forward bearing 46 is preferably included within the forward mounting bracket 44 through which the forward driveshaft 24 extends to facilitate rotational movement thereof.

Figure 5:
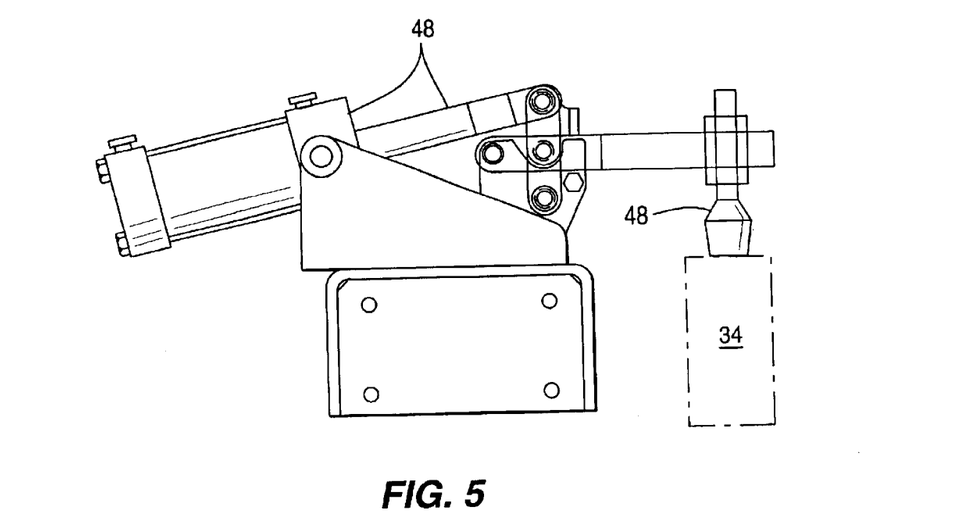
FIG. 5 is a top plan view of an embodiment of the forward safety clamping apparatus of the present invention.

A forward safety clamping mechanism 48 may also be included in the present invention for the purpose of clamping of the forward lifting arm 34 in the upper storage position 18 for safety reasons such that it is held in that position without falling downwardly which could possibly cause damage or injury. It is important to hold the forward lifting arm 34 in this position because normally it is this position in which the ladder 10 is held while the vehicle is driven. Driving of the vehicle can cause substantial vibrations which could cause the forward lifting arm 34 to move downwardly which could possibly damage property or injure personnel. As such, the forward safety clamping mechanism 48 is designed to hold the forward lifting arm 34 in the uppermost storage position 18. This forward safety clamping mechanism 48 is adapted to disengage from the forward lifting arm 34 prior to the initiation of movement thereof toward the lower access position 20.

Figure 4:
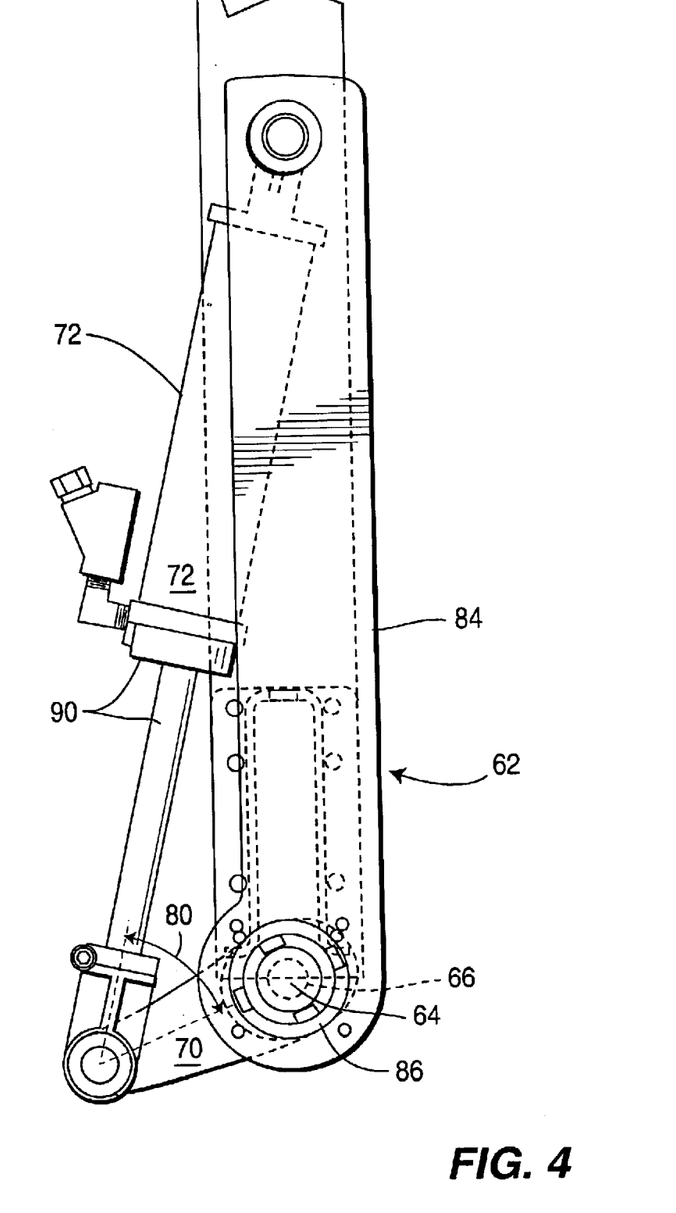
FIG. 4 is an end plan view of an embodiment of the rear support assembly of the present invention.

The configuration of the rear support assembly 62 is quite similar to the configuration of the forward support assembly 22 however it is located adjacent the rear vehicle body wall 60. Rear support assembly 62 is located within the vehicle body 14 and is preferably secured with respect to the rear body wall 60 to be spaced distant from the location of the forward support assembly 22. In this manner two points of securement and driving are provided for the ladder or other elongated equipment 10 and therefore stability in retaining and deploying thereof is significantly enhanced while at the same time providing full access to multiple side compartments 16 of the emergency vehicle 12.

The rear support assembly 62 preferably includes a rear driveshaft 64 which includes an inner rear driveshaft section 66 located within the vehicle body 14 and an outer rear driveshaft section 68 rotatable therewith and located outside of the vehicle body 14.

A rear drive arm 70 is preferably secured to the inner rear driveshaft section 66 of rear driveshaft 64 such that it extends outwardly therefrom. A rear longitudinally extendable means 72 such as a rear hydraulic cylinder and piston mechanism 90 is pivotally secured with respect to the inner portion of the rear vehicle body wall 60 and also secured to the rear drive arm 70. In this manner extension or retraction of the rear hydraulic cylinder and piston 90 will cause powered movement of the rear drive arm 70 and resulting movement of the rear driveshaft 64. A rear lifting arm 74 is preferably fixedly secured to the outer rear driveshaft section 68 and thus is powered for movement therewith. This movement will cause the rear lifting arm 74 to move between the upper storage position 18 and the lower access position 20. A rear support means 76 will preferably be secured to the rear lifting arm 74 and will be adapted to have the elongated object such as a ladder 10 or other similar means detachably secured thereto by a rear securement means 78. Rear securement means 78 is preferably allows detachable securement of the ladder 10 or other similar object relative to the rear support 76. Thus, when a ladder is positioned secured thereto, the ladder 10 can also be secured with respect to the forward support means 36 by the forward securement means 38 and in this manner firmly secure both ends of the elongated object relative to the apparatus of the present invention. In the preferred embodiment a longitudinal support 96 will be secured with respect to both the forward support 36 and the rear support 76 and can include a locking means 98 for securement of the ladder 10 in position relative to the longitudinal support 96.

To facilitate powering of rotational driving of the rear driveshaft 64 the orientation between the rear drive arm 70 and the rear hydraulic cylinder and piston 90 will preferably be oriented at a rear angle 80 of approximately 90 degrees when the rear lifting arm 74 is in or adjacent to the lower access position 20. Most preferably the rear angle 80 will be between 60 and 120 degrees whenever the rear lifting arm 74 is in or near the lower access position 20 to facilitate powering thereof which is required to a greater extent when the ladder or other object 10 is positioned near or adjacent to this lower access position 20 due to the lateral moment arm created relative to the vehicle body 14.

Figure 6:
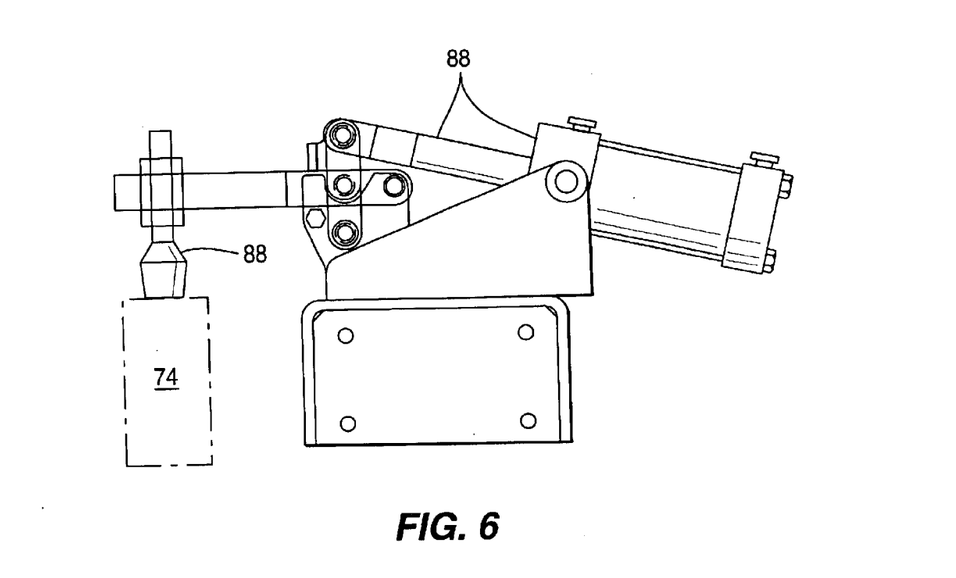
FIG. 6 is a top plan view of an embodiment of the rear safety clamping mechanism of the present invention.

In the preferred configuration of the present invention a rear mounting bracket 84 will also be included fixedly secured with respect to the rear vehicle body wall 60 within the vehicle body 14 itself. This rear mounting bracket 84 will include mounted therein a rear bearing means 86 through which the rear driveshaft 64 will extend to enhance rotatable movability thereof. The rear bearing 86 provides this capability of rotational movement for enhancing powered rotation of the rear driveshaft 64 for urging movement of the ladder 10 between the upper storage position 18 and the lower access position 20 thereof. A rear safety clamping means 88 can also be included which is capable of abutment with respect to the rear lifting arm 74 when it is positioned in the upper storage position 18. This provides safety in helping to retain the rear lifting arm 74 and the rear support 76 in the upper storage position 18 to prevent accidental movement thereof and injuring adjacent personnel or causing damage. The rear safety clamping mechanism 88 is also adapted to release the rear lifting arm 74 immediately prior to initiation of movement thereof away from the upper storage position 18 and toward the lower access position 20.

As such, the apparatus of the present invention provides a unique configuration for safely and carefully storing and providing access to rather large or elongated emergency equipment such as ladders 10 such that they can be stored above an emergency vehicle while providing access adjacent thereto while at the same time provide a maximum amount of area for the positioning of compartments 16 in the side areas of such emergency vehicles.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An apparatus for holding elongated objects horizontally adjacent to a vehicular body which is movable between an upper storage position and a lower access position, said apparatus comprising:

A. a forward support assembly secured with respect to the vehicular body and comprising:
      (1) a forward driveshaft means extending through the vehicular body and being rotatably movable with respect thereto, said forward driveshaft means including;
         (a) an inner forward driveshaft section positioned within the vehicular body; and
         (b) an outer forward driveshaft section positioned extending outside of the vehicular body and being simultaneously movable with said inner forward driveshaft section;
      (2) a forward drive arm means pivotally mounted to said inner forward driveshaft section and extending outwardly therefrom for urging pivotal movement thereof;

(3) a forward longitudinally extendible means pivotally mounted with respect to the vehicular body and pivotally secured with respect to said forward drive arm means for urging driving movement thereof between the storage position and the access position responsive to longitudinal movement thereof;

(4) a forward lifting arm means fixedly secured to said outer forward driveshaft section and being rotatably movable therewith;

(5) a forward support means fixedly secured to said forward lifting arm means and adapted to receive an object detachably secured with respect thereto, said forward support means being movable between an upper storage position thereof and a lower access position, selectively;

(6) a forward securement means for securing of an object detachably with respect to said forward support means to facilitate movement of the secured object between the upper storage position for storage thereof and the lower access position for providing access thereto;

B. a rear support assembly secured with respect to the vehicular body at a position spatially distant from said forward support assembly, said rear support assembly and said forward support assembly providing coordinated-support of an object for facilitating movement thereof between the upper storage position and the lower access position, respectively, said rear support assembly comprising:

(1) a rear driveshaft means extending through the vehicular body and being rotatably movable with respect thereto, said rear driveshaft means including;

(a) an inner rear driveshaft section positioned within the vehicular body; and (b) an outer rear driveshaft section positioned extending outside of the vehicular body and being simultaneously movable with said inner rear driveshaft section;

(2) a rear drive arm means pivotally mounted to said inner rear driveshaft section and extending outwardly therefrom for urging pivotal movement thereof;

(3) a rear longitudinally extendible means pivotally mounted with respect to the vehicular body and pivotally secured with respect to said rear drive arm means for urging driving movement thereof between the storage position and the access position responsive to longitudinal movement thereof;

(4) a rear lifting arm means fixedly secured to said outer rear driveshaft section and being rotatably movable therewith;

(5) a rear support means fixedly secured to said rear lifting arm means and adapted to receive an object detachably secured with respect thereto, said rear support means being movable between an upper storage position thereof and a lower access position, selectively;

(6) a rear securement means for securing of an object detachably with respect to said rear support means to facilitate movement of the secured object between the upper storage position for storage thereof and the lower access position for providing access thereto;

C. a longitudinal support means fixedly secured to said forward support means and to said rear support means to facilitate securement of an object with respect thereto and to facilitate coordinated movement of said forward support assembly and said rear support assembly between the upper storage position and the lower access position.

2. An apparatus as defined in claim 1 for holding elongated objects horizontally adjacent to a vehicular body which is movable between an upper storage position and a lower access position further comprising a locking means secured with respect to said longitudinal support means and adapted to detachably secure an elongated object with respect thereto selectively.

3. An apparatus as defined in claim 1 for holding elongated objects horizontally adjacent to a vehicular body which is movable between an upper storage position and a lower access position wherein said longitudinal support means is operative to retain an elongated object secured thereto in horizontal orientation at the upper storage position and at the lower access position and during movement thereof therebetween.

4. An apparatus as defined in claim 1 for holding elongated objects horizontally adjacent to a vehicular body having a front wall and a rear wall spatially disposed from one another wherein the apparatus is movable between an upper storage position and a lower access position and wherein said forward driveshaft means is positioned extending through the front vehicular wall and wherein said rear driveshaft means is positioned extending through the rear vehicular wall.

5. An apparatus as defined in claim 1 for holding elongated objects horizontally adjacent to a vehicular body which is movable between an upper storage position and a lower access position wherein said forward longitudinally extendible means is operative to extend outwardly to urge driving movement of said forward drive arm means to move said forward lifting arm means toward the lower access position thereof and wherein said rear longitudinally extendible means is operative to extend outwardly to urge driving movement of said rear drive arm means to move said rear lifting arm means toward the upper storage position thereof.

6. An apparatus as defined in claim 1 for holding elongated objects horizontally adjacent to a vehicular body which is movable between an upper storage position and a lower access position wherein said forward drive arm means and said forward longitudinally extendible means are oriented approximately perpendicularly with respect to one another whenever the forward lifting arm means is adjacent the access position thereof to maximize the moment arm of force directed on said forward drive arm means for enhancing powering of the rotational movement of said forward driveshaft means responsive to the forward lifting arm means being positioned adjacent the lower access position thereof.

7. An apparatus as defined in claim 1 for holding elongated objects horizontally adjacent to a vehicular body which is movable between an upper storage position and a lower access position wherein said forward drive arm means and said forward longitudinally extendible means are oriented approximately perpendicularly with respect to one another whenever the forward lifting arm means is adjacent the access position thereof to maximize the moment arm of force directed on said forward drive arm means for enhancing powering of the rotational movement of said forward driveshaft means responsive to the forward lifting arm means being positioned adjacent the lower access position thereof.

8. An apparatus as defined in claim 1 for holding elongated objects horizontally adjacent to a vehicular body which is movable between an upper storage position and a lower access position wherein said forward drive arm means and said forward longitudinally extendible means are oriented at between 60 degrees and 120 degrees with respect to one another whenever the forward lifting arm means is adjacent the access position thereof to maximize the moment arm of force directed on said forward drive arm means for enhancing powering of the rotational movement of said forward driveshaft means responsive to the forward lifting arm means being positioned adjacent the lower access position thereof.

9. An apparatus as defined in claim 1 for holding elongated objects horizontally adjacent to a vehicular body which is movable between an upper storage position and a lower access position wherein said rear drive arm means and said rear longitudinally extendible means are oriented approximately perpendicularly with respect to one another whenever the rear lifting arm means is adjacent the access position thereof to maximize the moment arm of force directed on said rear drive arm means for enhancing powering of the rotational movement of said rear driveshaft means responsive to the rear lifting arm means being positioned adjacent the lower access position thereof.

10. An apparatus as defined in claim 1 for holding elongated objects horizontally adjacent to a vehicular body which is movable between an upper storage position and a lower access position wherein said rear drive arm means and said rear longitudinally extendible means are oriented at between 60 degrees and 120 degrees with respect to one another whenever the rear lifting arm means is adjacent the access position thereof to maximize the moment arm of force directed on said rear drive arm means for enhancing powering of the rotational movement of said rear driveshaft means responsive to the rear lifting arm means being positioned adjacent the lower access position thereof.

11. An apparatus as defined in claim 1 for holding elongated objects horizontally adjacent to a vehicular body which is movable between an upper storage position and a lower access position wherein said forward support assembly includes a forward mounting bracket means fixedly secured to said vehicular body at a position therewithin, said inner forward driveshaft section of said forward driveshaft means being rotationally mounted within said forward mounting bracket means to facilitate urging of movement of said forward lifting arm means between the upper storage position and the lower access position.

12. An apparatus as defined in claim 11 for holding elongated objects horizontally adjacent to a vehicular body which is movable between an upper storage position and a lower access position wherein said forward support assembly includes a forward bearing means mounted within said forward mounting bracket means with said forward driveshaft means extending therethrough to facilitate rotational movement thereof.

13. An apparatus as defined in claim 1 for holding elongated objects horizontally adjacent to a vehicular body which is movable between an upper storage position and a lower access position wherein said rear support assembly includes a rear mounting bracket means fixedly secured to said vehicular body at a position therewithin, said inner rear driveshaft section of said rear driveshaft means being rotationally mounted within said rear mounting bracket means to facilitate urging of movement of said rear lifting arm means between the upper storage position and the lower access position.

14. An apparatus as defined in claim 13 for holding elongated objects horizontally adjacent to a vehicular body which is movable between an upper storage position and a lower access position wherein said rear support assembly includes a rear bearing means mounted within said rear mounting bracket means with said rear driveshaft means extending therethrough to facilitate rotational movement thereof.

15. An apparatus as defined in claim 1 for holding elongated objects horizontally adjacent to a vehicular body which is movable between an upper storage position and a lower access position further comprising a forward safety clamping means mounted on the vehicular body at a position adjacent the location of said forward lifting arm means when in the upper storage position, said forward clamping means being operative to detachably clamp said forward lifting arm means to prevent movement thereof when moved into the upper storage position, said forward safety clamping means being operative to release said forward lifting arm means prior to movement thereof away from the upper storage position.

16. An apparatus as defined in claim 1 for holding elongated objects horizontally adjacent to a vehicular body which is movable between an upper storage position and a lower access position further comprising a rear safety clamping means mounted on the vehicular body at a position adjacent the location of said rear lifting arm means when in the upper storage position, said rear clamping means being operative to detachably clamp said rear lifting arm means to prevent movement thereof when moved into the upper storage position, said rear safety clamping means being operative to release said rear lifting arm means prior to movement thereof away from the upper storage position.

17. An apparatus as defined in claim 1 for holding elongated objects horizontally adjacent to a vehicular body which is movable between an upper storage position and a lower access position wherein said forward longitudinally extendible means comprises a forward hydraulic cylinder and piston means.

18. An apparatus as defined in claim 1 for holding elongated objects horizontally adjacent to a vehicular body which is movable between an upper storage position and a lower access position wherein said rear longitudinally extendible means comprises a rear hydraulic cylinder and piston means.

19. An apparatus for holding elongated objects horizontally adjacent to a vehicular body which is movable between an upper storage position and a lower access position, said apparatus comprising:

A. a forward support assembly secured with respect to the vehicular body and comprising:
  (1) a forward driveshaft means extending through the vehicular body and being rotatably movable with respect thereto, said forward driveshaft means including;
    (a) an inner forward driveshaft section positioned within the vehicular body; and
    (b) an outer forward driveshaft section positioned extending outside of the vehicular body and being simultaneously movable with said inner forward driveshaft section;
  (2) a forward drive arm means pivotally mounted to said inner forward driveshaft section and extending outwardly therefrom for urging pivotal movement thereof;
  (3) a forward longitudinally extendible means pivotally mounted with respect to the vehicular body and pivotally secured with respect to said forward drive arm means for urging driving movement thereof between the storage position and the access position responsive to longitudinal movement thereof;

(4) a forward lifting arm means fixedly secured to said outer forward driveshaft section and being rotatably movable therewith, said forward drive arm means and said forward longitudinally extendible means being degrees with respect to one another whenever the forward lifting arm means is adjacent the access position thereof to maximize the moment arm of force directed on said forward drive arm means for enhancing powering of the rotational movement of said forward driveshaft means responsive to the forward lifting arm means being positioned adjacent the lower access position thereof;

(5) a forward support means fixedly secured to said forward lifting arm means and adapted to receive an object detachably secured with respect thereto, said forward support means being movable between an upper storage position thereof and a lower access position, selectively;

(6) a forward securement means for securing of an object detachably with respect to said forward support means to facilitate movement of the secured object between the upper storage position for storage thereof and the lower access position for providing access thereto;

(7) a forward mounting bracket means fixedly secured to said vehicular body at a position therewithin, said inner forward driveshaft section of said forward driveshaft means being rotationally mounted within said forward mounting bracket means to facilitate urging of selective movement of said forward lifting arm means between the upper storage position and the lower access position;

B. a rear support assembly secured with respect to the vehicular body at a position spatially distant from said forward support assembly, said rear support assembly and said forward support assembly providing coordinated support of an object for facilitating movement thereof between the upper storage position and the lower access position, respectively, said rear support assembly comprising:

(1) a rear driveshaft means extending through the vehicular body and being rotatably movable with respect thereto, said rear driveshaft means including;

(a) an inner rear driveshaft section positioned within the vehicular body; and (b) an outer rear driveshaft section positioned extending outside of the vehicular body and being simultaneously movable with said inner rear driveshaft section;

(2) a rear drive arm means pivotally mounted to said inner rear driveshaft section and extending outwardly therefrom for urging pivotal movement thereof;

(3) a rear longitudinally extendible means pivotally mounted with respect to the vehicular body and pivotally secured with respect to said rear drive arm means for urging driving movement thereof between the storage position and the access position responsive to longitudinal movement thereof;

(4) a rear lifting arm means fixedly secured to said outer rear driveshaft section and being rotatably movable therewith;

(5) a rear support means fixedly secured to said rear lifting arm means and adapted to receive an object detachably secured with respect thereto, said rear support means being movable between an upper storage position thereof and a lower access position, selectively, said rear drive arm means and said rear longitudinally extendible means being oriented at between 60 degrees and 120 degrees with respect to one another whenever the rear lifting arm means is adjacent the access position thereof to maximize the moment arm of force directed on said rear drive arm means for enhancing powering of the rotational movement of said rear driveshaft means responsive to the rear lifting arm means being positioned adjacent the lower access position thereof;

(6) a rear securement means for securing of an object detachably with respect to said rear support means to facilitate movement of the secured object between the upper storage position for storage thereof and the lower access position for providing access thereto;

(7) a rear mounting bracket means fixedly secured to said vehicular body at a position therewithin, said inner rear driveshaft section of said rear driveshaft means being rotationally mounted within said rear mounting bracket means to facilitate urging of movement of said rear lifting arm means between the upper storage position and the lower access position;

C. a longitudinal support means fixedly secured to said forward support means and to said rear support means to facilitate securement of an object with respect thereto and to facilitate coordinated movement of said forward support assembly and said rear support assembly between the upper storage position and the lower access position;

D. a locking means secured with respect to said longitudinal support means and adapted to detachably secure an elongated object with respect thereto selectively;

E. a forward safety clamping means mounted on the vehicular body at a position adjacent the location of said forward lifting arm means when in the upper storage position, said forward clamping means being operative to detachably clamp said forward lifting arm means to prevent movement thereof when moved into the upper storage position, said forward safety clamping means being operative to release said forward lifting arm means prior to movement thereof away from the upper storage position; and F. a rear safety clamping means mounted on the vehicular body at a position adjacent the location of said rear lifting arm means when in the upper storage position, said rear clamping means being operative to detachably clamp said rear lifting arm means to prevent movement thereof when moved into the upper storage position, said rear safety clamping means being operative to release said rear lifting arm means prior to movement thereof away from the upper storage position.

20. An apparatus for holding elongated objects horizontally adjacent to a vehicular body which is movable between an upper storage position and a lower access position, said apparatus comprising:

A. a forward support assembly secured with respect to the vehicular body and comprising:

(1) a forward driveshaft means extending through the vehicular body and being rotatably movable with respect thereto, said forward driveshaft means including;

(a) an inner forward driveshaft section positioned within the vehicular body; and (b) an outer forward driveshaft section positioned extending outside of the vehicular body and being simultaneously movable with said inner forward driveshaft section;

(2) a forward drive arm means pivotally mounted to said inner forward driveshaft section and extending outwardly therefrom for urging pivotal movement thereof;

(3) a forward longitudinally extendible means pivotally mounted with respect to the vehicular body and pivotally secured with respect to said forward drive arm means for urging driving movement thereof between the storage position and the access position responsive to longitudinal movement thereof, said forward longitudinally extendible means comprising a forward hydraulic cylinder and piston means;

(4) a forward lifting arm means fixedly secured to said outer forward driveshaft section and being rotatably movable therewith, said forward drive arm means and said forward longitudinally extendible means being oriented approximately perpendicularly with respect to one another whenever the forward lifting arm means is adjacent the access position thereof to maximize the moment arm of force directed on said forward drive arm means for enhancing powering of the rotational movement of said forward driveshaft means responsive to the forward lifting arm means being positioned adjacent the lower access position thereof;

(5) a forward support means fixedly secured to said forward lifting arm means and adapted to receive an object detachably secured with respect thereto, said forward support means being movable between an upper storage position thereof and a lower access position, selectively;

(6) a forward securement means for securing of an object detachably with respect to said forward support means to facilitate movement of the secured object between the upper storage position for storage thereof and the lower access position for providing access thereto;

(7) a forward mounting bracket means fixedly secured to said vehicular body at a position therewithin, said inner forward driveshaft section of said forward driveshaft means being rotationally mounted within said forward mounting bracket means to facilitate urging of selective movement of said forward lifting arm means between the upper storage position and the lower access position;

(8) a forward bearing means mounted within said forward mounting bracket means with said forward driveshaft means extending therethrough to facilitate rotational movement thereof;

B. a rear support assembly secured with respect to the vehicular body at a position spatially distant from said forward support assembly, said rear support assembly and said forward support assembly providing coordinated support of an object for facilitating movement thereof between the upper storage position and the lower access position, respectively, said rear support assembly comprising:

(1) a rear driveshaft means extending through the vehicular body and being rotatably movable with respect thereto, said rear driveshaft means including;

(a) an inner rear driveshaft section positioned within the vehicular body; and (b) an outer rear driveshaft section positioned extending outside of the vehicular body and being simultaneously movable with said inner rear driveshaft section;

(2) a rear drive arm means pivotally mounted to said inner rear driveshaft section and extending outwardly therefrom for urging pivotal movement thereof;

(3) a rear longitudinally extendible means pivotally mounted with respect to the vehicular body and pivotally secured with respect to said rear drive arm means for urging driving movement thereof between the storage position and the access position responsive to longitudinal movement thereof, said rear longitudinally extendible means comprising a rear hydraulic cylinder and piston means;

(4) a rear lifting arm means fixedly secured to said outer rear driveshaft section and being rotatably movable therewith;

(5) a rear support means fixedly secured to said rear lifting arm means and adapted to receive an object detachably secured with respect thereto, said rear support means being movable between an upper storage position thereof and a lower access position, selectively, said rear drive arm means and said rear longitudinally extendible means being oriented at approximately perpendicularly with respect to one another whenever the rear lifting arm means is adjacent the access position thereof to maximize the moment arm of force directed on said rear drive arm means for enhancing powering of the rotational movement of said rear driveshaft means responsive to the rear lifting arm means being positioned adjacent the lower access position thereof;

(6) a rear securement means for securing of an object detachably with respect to said rear support means to facilitate movement of the secured object between the upper storage position for storage thereof and the lower access position for providing access thereto;

(7) a rear mounting bracket means fixedly secured to said vehicular body at a position therewithin, said inner rear driveshaft section of said rear driveshaft means being rotationally mounted within said rear mounting bracket means to facilitate urging of movement of said rear lifting arm means between the upper storage position and the lower access position;

(8) a rear bearing means mounted within said rear mounting bracket means with said rear driveshaft means extending therethrough to facilitate rotational movement thereof;

C. a longitudinal support means fixedly secured to said forward support means and to said rear support means to facilitate securement of an object with respect thereto and to facilitate coordinated movement of said forward support assembly and said rear support assembly between the upper storage position and the lower access position;

D. a locking means secured with respect to said longitudinal support means and adapted to detachably secure an elongated object with respect thereto selectively;

E. a forward safety clamping means mounted on the vehicular body at a position adjacent the location of said forward lifting arm means when in the upper storage position, said forward clamping means being operative to detachably clamp said forward lifting arm means to prevent movement thereof when moved into the upper storage position, said forward safety clamping means being operative to release said forward lifting arm means prior to movement thereof away from the upper storage position; and F. a rear safety clamping means mounted on the vehicular body at a position adjacent the location of said rear lifting arm means when in the upper storage position, said rear clamping means being operative to detachably clamp said rear lifting arm means to prevent movement thereof when moved into the upper storage position, said rear safety clamping means being operative to release said rear lifting arm means prior to movement thereof away from the upper storage position.

* * * * *

UNITED STATES PATENT AND TRADEMARK OFFICE
CERTIFICATE OF CORRECTION

PATENT NO. : 6,827,541 B1
DATED : December 7, 2004
INVENTOR(S) : Michael Paul Ziaylek et al.

It is certified that error appears in the above-identified patent and that said Letters Patent is hereby corrected as shown below:

Column 13,
Line 4, after "being" please insert -- oriented at between 60 degrees and 120 --.

Signed and Sealed this

Twelfth Day of July, 2005

JON W. DUDAS
*Director of the United States Patent and Trademark Office*